United States Patent [19]
Larsen

[11] Patent Number: 5,840,360
[45] Date of Patent: Nov. 24, 1998

[54] PROCESS FOR EXTRACTING ROASTED AND GROUND COFFEE

[75] Inventor: Torben Brinch Larsen, Hørsholm, Denmark

[73] Assignee: Niro Holding A/S, Søborg, Denmark

[21] Appl. No.: 658,301

[22] Filed: Jun. 5, 1996

Related U.S. Application Data

[63] Continuation of Ser. No. 78,251, Jun. 21, 1993, abandoned.

[30] Foreign Application Priority Data

Jan. 28, 1991 [DK] Denmark .................. 0147/91

[51] Int. Cl.$^6$ ...................................... A23F 5/24
[52] U.S. Cl. ...................... 426/594; 426/432; 426/434
[58] Field of Search .................... 426/594, 432, 426/434

[56] References Cited

U.S. PATENT DOCUMENTS

| | | |
|---|---|---|
| 2,340,758 | 2/1944 | Kappenberg et al. . |
| 2,931,728 | 4/1960 | Franck et al. . |
| 3,420,674 | 1/1969 | McCartney et al. . |
| 3,549,380 | 12/1970 | Patel et al. . |
| 4,606,921 | 8/1986 | Liu .......................................... 426/386 |
| 4,701,333 | 10/1987 | Margolis et al. ...................... 426/432 |
| 4,702,333 | 10/1987 | Lippert .................................... 180/140 |
| 4,707,368 | 11/1987 | Vogel et al. ........................ 426/432 X |

FOREIGN PATENT DOCUMENTS

| | | |
|---|---|---|
| 227262 | 1/1987 | European Pat. Off. . |
| 620383 | 5/1949 | United Kingdom . |

OTHER PUBLICATIONS

Sivetz et al. Coffee Techology, 1979, AVI: Westport, Connecticut, pp. 334–335, 337–338.

Sivetz and Foote: Coffee Processing Technology, the AVI Publishing Company, Inc., Westport, Connecticut (1963), vol. 1, pp. 320–348.

Clarke and Macrae: Coffee, Elsevier Applied Science, London (1987), vol. 2, pp. 109–145.

*Primary Examiner*—Anthony J. Weier
*Attorney, Agent, or Firm*—Sterne, Kessler, Goldstein & Fox, P.L.L.C.

[57] ABSTRACT

A process for extracting roasted and ground coffee in an extractor is presented. In this process, the coffee is wetted by a mixture of water at a temperature between 20° and 100° C. to obtain a water content 20–50% by weight. Then the wetted coffee is transferred to an oblong abstractor to essentially fill the extractor. After the coffee has been transferred, gasses and water vapor are evacuated from the extractor to obtain the pressure of between 600 millibar and a value corresponding to the vapor pressure of water at the temperature at which the wetted coffee obtained as a result of the initial pre-wetting process. While maintaining the extractor at this pressure, and without any further evacuation of gasses and water vapor, a hot aqueous extraction liquid is introduced at one end of the evacuated extractor to fill it. The extractor is maintained at temperatures above 100° C. during this process. Finally, an aqueous extract containing both volatile an nonvolatile flavor components is removed form the opposite end of the extractor.

11 Claims, 1 Drawing Sheet

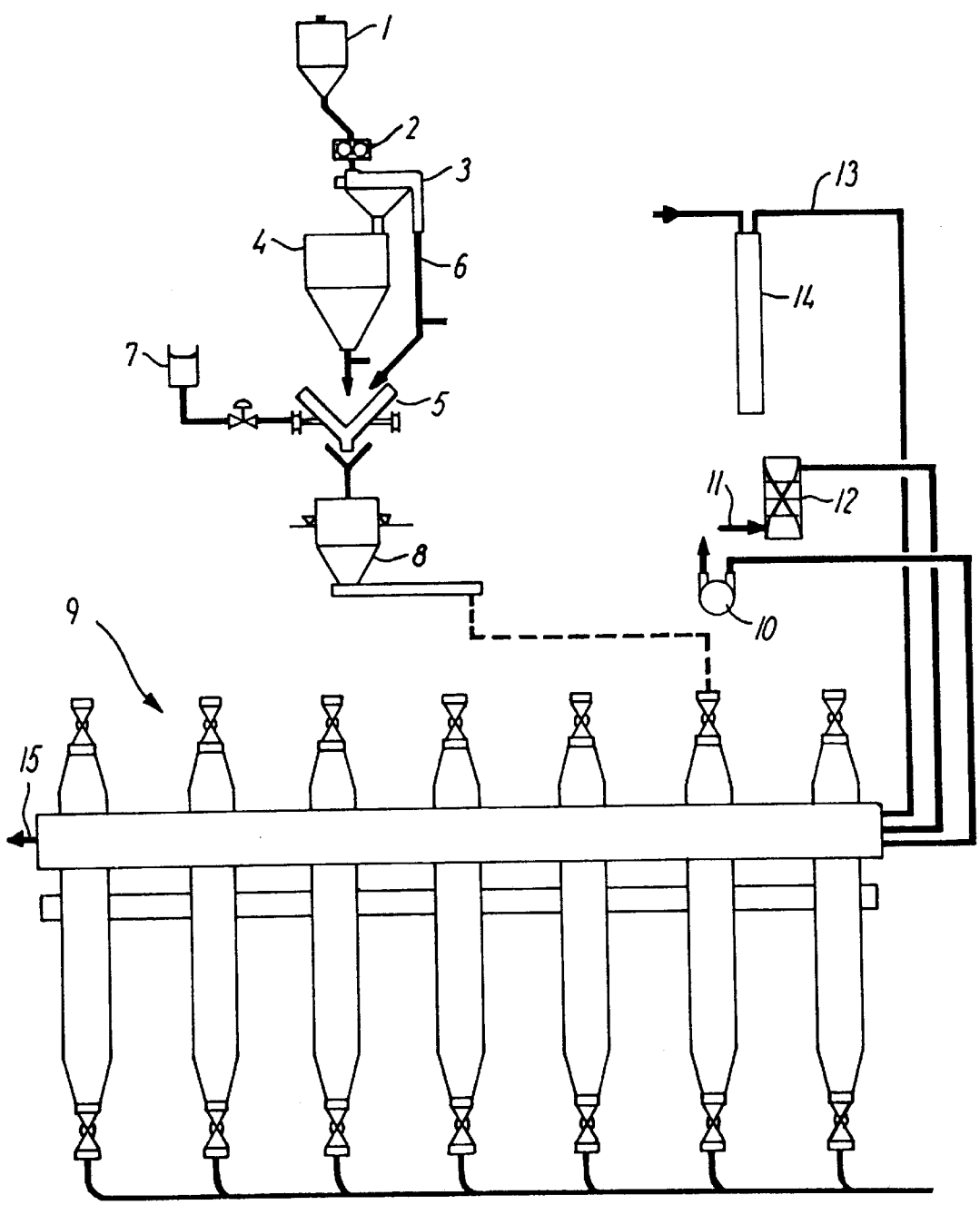

PROCESS FOR EXTRACTING ROASTED AND GROUND COFFEE

This application is a continuation of application Ser. No. 08/078,251, filed Jun. 21, 1993 now abandoned which is a national stage filing of PCT/DK92/00016 filed Jan. 21, 1992.

BACKGROUND OF THE INVENTION

1. Field of the Invention

The present invention relates to a process of extracting roasted and ground coffee for obtaining a coffee extract, mainly for use as a starting material for producing a soluble coffee powder, normally called instant coffee or powdery coffee.,

2. Related Art

A considerable economic interest exist in industrial coffee extraction for producing a coffee extract for use as such or for the manufacture of a soluble coffee powder. This is due not only to the fact that the latter product is easier to use for the consumers than ground, roasted coffee, but also to the fact that industrial extraction makes it possible to obtain a far better utilization of the coffee than what is possible with the extraction methods normally used in a household.

A survey of the known methods for industrial coffee extraction is found in M. Sivetz and H. Elliott Foote: Coffee Processing Technology, The AVI Publishing Company, Inc., Westport, Conn. (1963), volume 1, as well as in R. J. Clarke and R. Macrae: Coffee, Elsevier Applied Science, London (1987), volume 2.

To attain a high extract yield the extraction is carried out at temperatures above 100° C. and during several hours.

Normally extraction batteries consisting of several extractors are used, the said extractors being connected in such a way that a counterflow-like extraction process is achieved with such a process fresh extraction water is transferred to the extractor, which holds the coffee that has been extracted for the longest time, while the extract, which is recovered from said extractor, is transferred to the extractor, which holds the coffee that has been extracted for the second longest period of time and so on, until the final extract is recovered from the extractor, which holds the coffee that has been extracted for the shortest period of time.

Due to the long duration of the extraction and the high temperatures used in conventional industrial coffee extraction process, there is a risk that the quality of the extract will be impaired due to damaging oxidation processes and loss of desired aroma components.

Various principles have been suggested with respect to the construction of the individual extractors. Thus British Patent No. 620,383 discloses an arrangement in which the recirculating extraction fluid is sprayed over the coffee while it is kept in a bag, so that the passage of the extraction fluid through the ground coffee will take place due to the gravitational effect.

Such an extractor unit has, however, an unsatisfactorily low extraction capacity in relation to the volume of the unit and the manufacturing costs thereof, and it is unsuitable for the production of extracts with a high content of dry matter and consequently relatively high viscosity.

It is therefore generally preferred that extraction units use extractors, which are substantially completely filled up with coffee and then subsequently supplied with extraction liquid to fill out the interspaces between the coffee particles. This is because since with such extractors it is easier to control the liquid flow rate in relation to the coffee particles by adjusting the difference between the pressure at which the extract is supplied and the pressure at which it is recovered.

The most efficient extraction is achieved with a high liquid flow. The possibility of retaining a high liquid flow is, however, limited for several reasons. One problem is that there is a tendency for a compact layer of relatively fine coffee particles to be created close to the place, at which the extract is recovered, the layer yielding considerable resistance towards the liquid flow, and which resistance cannot be surpassed by increasing the difference of pressure.

To counteract this tendency it has been suggested in U.S. Pat. No. 2,931,728 to place a layer of fairly coarse particles near the place of recovery for the extract.

This approach to some extent increases the possibility of maintaining a high liquid flow. It turns out, however, that even when such a layer of coarse particles is used, problems will arise with respect to maintaining the liquid flow at a sufficiently high level. This is because the resistance towards the flow of the liquid through the coffee mass is increased due to reasons not previously fully realized.

According to the conventional extraction process, which has been described by Sivetz et al., loc. cit., the ground coffee is introduced into the air-filled extractor, whereafter the hot extraction liquid is introduced, the air present in the extractor being displaced.

As, however, a considerable heating of the coffee takes place before the air displament has ended, high amounts of aromatic substances from the coffee are carried off with the air during its displament.

To prevent these aromatic substances from being wasted, the displaced air is let through a freezing trap for collection of the desired components. This collection of the desired aromatic components from the displaced air is, however, complicated by the fact that the aromatic substances are mixed with so high amounts of air and water vapor, as is the case, that several cooling steps and very low temperatures are required. This makes this recovery a considerably cost-consuming complication in the extraction process.

An embodiment of such an aroma recovery process is the subject of U.S. Pat. No. 4,606,921.

Furthermore, other processes having a certain similarity to these aroma recovery processes are known. In the process coffee is intentionally subjected to a pre-treatment for removal of aromatic substances prior to the extraction, with a view of bringing back the aromatic substances to the attained extract. This aroma removal is, according to European Patent No. 227,262 and U.S. Pat. No. 4,707,368, carried out by means of a vapour treatment under vacuum.

Roasted, ground coffee beans, in the present specification often just termed coffee, typically contain 6–7% moisture. As this material is difficult to wet with the coffee extract with which it is to be extracted, it is known to carry out a pre-wetting of the coffee by water, cf. U.S. Pat. No. 2,340, 758 and Sivetz et al., loc. cit. The latter states that this wetting may take place before, but preferably after, the introduction of the coffee into the extractor.

Also, U.S. Pat. No. 4,702,333 deals with a pre-wetting of the coffee, which apparently is performed on a step-wise manner, a total of at least two parts by weight of water for each part of coffee, before the wetted coffee is transferred to an extractor.

A pre-wetting process for coffee is also disclosed in U.S. Pat. No. 3,549,380. According to this process an aqueous liquid is sprayed onto the coffee, as it is being loaded into an extraction column. However, such a procedure is less suitable in the process according to the present invention, as described below, where a very intimate admixture of pre-wetting water and coffee is essential.

It should further be observed that it has been suggested (U.S. Pat. No. 3,420,674) to reduce the acid content of steamed coffee by vacuum treatment before extraction, to improve the flavour of the final product.

SUMMARY OF THE INVENTION

The present invention relates to a process for extracting roasted and ground coffee in which a considerable increase of the liquid flow to the extractor and a correspondingly shorter extraction time are achieved.

The present invention accordingly relates to a process for extracting roasted and ground coffee in an extractor, according to which process the coffee is pre-wetted before being transferred to the extractor, the process according to the invention comprises the steps of:

a) the coffee is wetted by admixture of water at a temperature between 20° and 100° C. to obtain a water content of 20–50% by weight, b) the wetted coffee is transferred to an oblong extractor to essentially fill the extractor therewith, c) gases and water vapor is evacuated from the extractor to obtain a pressure of between 600 millibar and a value corresponding to the vapor pressure of water at the temperature, which the wetted coffee obtains as a result of the mixing according to step a), d) without any further evacuation of gases and water vapor a hot, aqueous extraction liquid is introduced at one end of the evacuated extractor to fill it, and extraction is carried out at temperatures above 100° C., and in that e) an aqueous extract containing both volatile flavor components as well as nonvolatile coffee components is removed from the other end of the extractor.

Further features and advantages of the present invention, as well as the structure and operation of various embodiments of the present invention, are described in detail below with reference to the accompanying drawing.

BRIEF DESCRIPTION OF THE DRAWINGS

The invention will be better understood by reference to the accompanying drawings, wherein FIG. 1 is a schematic overview of the preferred embodiment of the coffee extraction apparatus of the present invention.

DETAILED DESCRIPTION OF THE PREFERRED EMBODIMENTS

It has now turned out that by carrying out the extraction as described below according to the invention a considerable increase of the liquid flow in the extractor and a correspondingly shorter extraction time are achieved, and the hitherto used operations for recovery of aromatic substances are made superfluous.

The present invention accordingly relates to a process for extracting roasted and ground coffee in an extractor, according to which process the coffee is pre-wetted before being transferred to the extractor, which process according to the invention comprises the steps of a) the coffee is wetted by admixture of water at a temperature between 20° and 100° C. to obtain a water content of 20–50% by weight, b) the wetted coffee is transferred to an oblong extractor to essentially fill the extractor therewith, c) gases and water vapor is evacuated from the extractor to obtain a pressure of between 600 millibar and a value corresponding to the vapor pressure of water at the temperature, which the wetted coffee obtains as a result of the mixing according to step a), d) without any further evacuation of gases and water vapor a hot, aqueous extraction liquid is introduced at one end of the evacuated extractor to fill it, and extraction is carried out at temperatures above 100° C., and in that e) an aqueous extract containing both volatile flavor components as well as non-volatile coffee components is removed from the other end of the extractor.

In preferred embodiments of the process according to the invention water having a temperature of 50°–100° C. is used for the wetting according to step a), and when evacuating the extractor according to step c) the pressure is reduced to a value corresponding to the vapor pressure of water, which the wetted coffee obtains as a result of the mixing with hot water according to step a). By these measures a particularly efficient deaeration of the coffee is obtained.

The reason why essentially higher liquid flows are achieved by means of the process according to the present invention, and subsequent shorter extraction times than by conventional processes is the due to the fact that by the evacuation according to step c), an effective removal of the amount of air present in the extractor, as well as an effective displacement of carbon dioxide from the inner of the coffee grains, are achieved as a result of the vaccum, and (2) by introducing the extraction liquid without the coffee having in the meantime been in contact with air, formation of essential amounts of foam in the extraction liquid is avoided. Tests in special testing equipment have shown that if the measures in question are not taken, color changes may appear in certain parts of the extractor, which indicates the formation of a foam of very fine bubbles. This foam reduces the ability of the extraction liquid to disperse among the coffee particles, and drastically increases the resistance towards the liquid flow through the bed of coffee particles.

A treatment with vapor and vacuum like the one previously suggested for expelling volatile components, cf. the above European Patent No. 227,262 and U.S. Pat. No. 4,707,368, cannot prevent such a formation of foam, as an absorption of atmospheric air in the period of time between the treatment and the contact with the extraction liquid presumably takes place.

Furthermore, it should be noted, that the process suggested according to the British Patent No. 620,383 for the protection of the coffee against oxidation, by creating a vaccuum in the extractor after the introduction of the coffee, but before the introduction of the extraction liquid, if it was used in connection with a process of the kind being the subject matter of the present invention, would not prevent the formation of foam in question. Such a vacuum treatment in the extractor itself with a maintenance of the vacuum until the introduction of the extraction liquid, would not per se be able to prevent the formation of foam at the succeeding extraction. This is because the vacuum treatment takes place without any pre-wetting of the coffee by hot water, and the coffee will not, therefore during the succeeding introduction of hot extraction liquid, be wetable thereby without the formation of foam.

The evacuation of gases and water vapor from the extractor, which is carried out in step c) before the introduction of the hot extraction liquid, takes place at such a low temperature and at such a speed that the amount of aromatic substances, which is removed from the coffee, is small, and consequently no recovery will be needed. When the hot extraction liquid in step d) is introduced into the extractor, there is no need to drive off air therefrom, and the above problem concerning recovery of aroma from the expelled air therefore does not exist.

The extract resulting from the process thus already contains the volatile aromatic components, which, according to the conventional methods are admixed with the extract after the recovery of this, possibly after a further processing of the extract.

In a preferred embodiment of the process the roasted, grounded coffee is, prior to the wetting in step a), subjected to a sifting to divide the coffee into a coarse fraction and a fine fraction. The coarse fraction constitutes 1–10% by weight of the amount of coffee, while the fine fraction constitutes the remainder. Next the two fractions are wetted separately, and according to step b), introduced in such a way that the coarse fraction is placed at the end of the extractor, from which the extract is removed. The sifting is preferably carried out by means of a sieve having a mesh size of 2–4 mm. By using this measure, which per se is known from the above U.S. Pat. No. 2,931,728, it is possible to fully exploit the reduction of the resistance against the liquid flow through the bed of pulverized coffee, said reduction being achieved due to the fact that the formation of foam is avoided.

It is thus possible, by controlling the amount of extraction liquid which is introduced into the extractor, to carry out the extraction with a liquid flow of 20–50 m/h, calculated on the basis of the amount of liquid passing through the extractor, and the area of a section perpendicular to the flow path through the extractor, the presence of the coffee being left out of consideration.

In a preferred embodiment of the process, the extractor is part of a battery of several extractors connected in series in a manner known per se in such a way that hot water under pressure is introduced into the extractor containing the coffee, which has been extracted for the longest period of time, while the final extract is recovered from the extractor, which is the last one to have been filled with wetted coffee, water is supplied at a temperature of 160°–190° C. and in that the coffee is removed from the extractor after the extraction of 45–60% by weight of its dry matter at an extraction time of 1–2 ½ hours.

Contrary to this the known extraction processes for obtaining extraction yields of the same size and with the use of similar temperatures requires extraction times of approx. 4 hours.

The extract attained has a good flavor and a good smell, as nearly all the aromatic components of the originally roasted coffee have been retained in the extract, as they have not been driven off when the extractors were filled with liquid, and in particular because of the fairly short extraction time it maintains the desired nuances as to flavor better than is the cases with the conventional, more protracted processes.

The process according to the invention will be described in detail in the following with reference to the accompanying drawing, which shows a plant suited for carrying out the process.

Referring to FIG. 1, a silo 1 for roasted coffee beans is shown, from which they are transferred to a coffee mill 2. From there the ground coffee is transferred to a sieve 3 with a mesh size, which is typically 2–4 mm.

The fraction of the ground coffee, which passes through the sieve 3 and which makes out by far the major amount of coffee, is collected in a silo 4, which is installed in such a way that its content can be transferred to a mixing apparatus 5 serving as a pre-wetter.

From the sieve 3 a conduit 6 is leading, through which the fraction of the coffee retained on the sieve, can be conveyed to the mixing apparatus 5.

The mixing apparatus 5 is connected to a container 7 for water having a temperature between 20° and 100° C., for wetting the ground coffee in the mixing apparatus 5.

From the container 7 hot water is transferred to the mixing apparatus for the attainment of a moisture content in the coffee of 20–50% by weight, preferably approx. 30% by weight.

As will be seen, the plant makes it possible to wet separately the relatively fine fraction, which is conveyed to the mixing apparatus 5 via the silo 4, and the relatively coarse fraction, which is conveyed through the pipe 6.

From the mixing apparatus 5 the wet coffee is transferred to a weighing silo 8 and from there to an extractor, which forms part of an extraction battery 9. Referring to FIG. 1, extraction battery 9 is comprised of seven extractors.

When filling an extractor with pre-wetted coffee it is advantageous, if the extraction liquid is to be conveyed from the top of the extractor to the bottom thereof, to initially introduce the coarse fraction of the ground coffee, which via the pipe 6, is conveyed to the mixing apparatus 5, and then to fill up the extractor with the finer fraction of the ground coffee conveyed to the mixing apparatus 5 from the silo 4.

The extractors are all connected to a vacuum pump 10. When an extractor has been filled with coffee, the connection between the extractor and the vacuum pump is opened and the pump is started for evacuating inter- and intra-particular air and gas. In the preferred embodiment a relatively quick evacuation is performed, which is continued until a pressure has been achieved which corresponds to the steam pressure of water at the temperature prevailing in the extractor. The attainment of this pressure can be seen thereby that continued evacuation will not result in any essential further pressure drop in the extractor.

When the pressure has been reduced to this value, the evacuation is stopped in order to prevent volatile aroma components from being carried off.

It is essential for the attainment of the object of the invention that an extraction liquid is then introduced into the extractor, without any possibility having existed in the meantime for air to penetrate into the evacuated extractor.

As extraction liquid to be introduced into the evacuated extractor a hot coffee extract from another extractor in the extraction battery can be used. However, it is preferred that the extraction liquid, which is the first to get in contact with the wetted coffee, is hot water, which will then subsequently be replaced by coffee extract, which has passed the remaining extractors of the extraction battery. Thereby it is achieved that the resulting coffee extract gets a flavor and an aroma similar to freshly made coffee from a household.

The drawing shows a supply pipe 11 for water for this initial filling of the extractors. This water is pre-heated in a heat exchanger 12 at a temperature of typically 120° C.

When the extractor is thus filled with hot water, it is in a manner known per se inserted in the extraction battery, so that in its upper part extract from the bottom of the extractor, in which the coffee has stayed for the shortest period, will be introduced.

To the top of the extractor, in which the coffee has been under extraction for the longest period, water is supplied through a pipe 13 heated to for instance 160°–180° C. in a heating device 14.

One of the extractors will typically be in the process of being emptied or being filled and consequently disconnected from the circulation in the extraction battery. The extract leaving this battery through a pipe, shown by 15 in the drawing, is thus partly made up from extract, which has passed six extractors, partly from the extract resulting from the relatively short contact of the water first supplied with the freshly introduced coffee.

The operation of the extraction battery is otherwise carried out in a completely traditional way as to conveyance of the liquid, the emptying of the extractors, etc.

The process according to the invention will be illustrated further by means of the following Example.

EXAMPLE

As starting material in this example 247.0 kg roasted coffee of Robusta-type was used. The roasted coffee contained 6% water, corresponding to an amount of dry matter of 232.18 kg. After grinding the coffee was sifted through a sieve with a mesh size of 3.5 mm. On the sieve 9.52 kg coarsely ground coffee corresponding to 4.1% was retained, while the fraction passing the sieve amounted to 237.48 kg.

Each of the two fractions of ground coffee was wetted by being mixed for approx. 15 minutes using one part by weight of boiling water for two parts by weight of coffee. The resulting mixture, which looked like dry ground coffee had a temperature of approx. 55° C.

The extraction itself took place in a pilot battery consisting of seven extractors, each with a length of approx. 4 meter and an inner diameter of 57 mm, corresponding of a volume of 10.2 liter.

After the filling of an extractor with coffee, first the coarse fraction and then the finer one, the extractor was exposed to vacuum corresponding to approx. 150 m bar absolute pressure.

Without breaking the vacuum the extractor was then filled with water with a temperature of approx. 120° C.

The extractors were connected during operation for the attainment of a counter-current like extraction of the coffee as described above.

Every fifteenth minute an extractor was taken out of circulation, emptied and filled with fresh coffee as described above. To the extractor, in which the coffee had been extracted for the longest period of time, water at a temperature of 180° C. and an absolute pressure of approx. 13 bar was added. The addition was made, as already said, to the extractor, which was leached to the highest degree, while the extract was recovered from the extractor with fresh coffee. The amount of water supplied amounted to approx. 83 l/h.

The test comprised 80 fillings of the extractors, corresponding to twenty hours of operation. During this period an amount of extract of 1637 kg with a content of dry matter of 128 kg was produced. This corresponds to a yield of 52.2% of the dry matter supplied in the roasted and ground coffee. The liquid flow in the extractors, calculated without regard to the presence of the coffee, amounted to approx. 32.5 m/h.

The extract yield had an excellent flavor and aroma and was better than the extract achieved according to conventional methods, for instance as described in the following example by way of comparison.

Comparative Example

The way of proceeding was like in the Example, but without separation of the ground beans and without prewetting of the coffee and without exposure to vacuum of the extractors before the beginning of the extraction.

In this case it was not possible to obtain a liquid flow of more than 12 m/h, as attempts to increase the flow rate by increasing the supply pressure of the extraction liquid resultated in clogging problems. The yield was therefore only 47%. When the extraction was extended with a view of attaining a yield of the same size as the one gained in the Example, a prolongation of the residence time of the coffee in the extractors up to approx. 4 hours was required.

I claim:

1. A process for extracting an amount of roasted and ground coffee in an extractor, wherein the coffee is prewetted before being transferred to the extractor, the process comprising the steps of:
   a) wetting the coffee with water having a first temperature between 20° C. and 100° C. to obtain a wetted coffee mixture having a water content of 20–50% by weight, said wetted coffee mixture having a second temperature;
   b) transferring said wetted coffee mixture created in said step a) to the extractor to essentially fill the extractor therewith;
   c) after the extractor is essentially filled with said wetted coffee mixture, evacuating gases and water vapor from the extractor to obtain a pressure of between 600 millibar and a value corresponding to the vapor pressure of water at said second temperature obtained by said wetted coffee mixture as a result of said wetting step a);
   d) without any further evacuation of gases and water vapor from said evacuated extractor and prior to the introduction of gases or air into said evacuated extractor, introducing a hot, aqueous extraction liquid at a first end of said evacuated extractor to substantially fill said extractor, said introduction of said aqueous extraction liquid causing substantially no foam to be created;
   e) supplying further hot, aqueous extraction liquid to said first end of the extractor and removing an aqueous extract containing both volatile coffee flavor components as well as non-volatile coffee flavor components from a second end of the extractor opposite said first;
   f) controlling the amount of said further extraction liquid to obtain a liquid flow rate through the extractor of 20–50 m/h, calculated on basis of the amount of liquid passing through the extractor and the area of a section perpendicular to the flow path through the extractor, disregarding the presence of the coffee; and
   g) removing the coffee from the extractor after extraction of 45–60% by weight of its solid matter at an extraction time of from 1 to 2.5 hours.

2. The process according to claim 1, wherein said pressure of said evacuation is momentarily reduced to a value corresponding to the vapor pressure of water at said second temperature.

3. The process according to claim 1, wherein prior to said wetting step a), sifting the roasted and ground coffee to divide the coffee into a coarse fraction and a fine fraction, said coarse fraction constituting 1–10% by weight of the amount of coffee, while said fine fraction constitutes a remaining 90–99% by weight of the amount of coffee wherein said coarse fraction and fine fraction are according to step b) introduced in such a way that said coarse fraction is placed in said second end of the extractor.

4. The process according to claim 3, wherein said sifting is made by means of a sieve with a mesh size of approximately 4 mm.

5. The process according to claim 1, wherein the extractor is part of a battery of several extractors connected in series, wherein the extraction liquid which is introduced into a first extractor of said battery is water at 160°–190° C. under pressure, said first extractor containing the coffee which has been extracted for the longest period of time, while the final extract is recovered from a second extractor, said second extractor being the last of said several extractors to have been filled with said wetted coffee mixture.

6. The process according to claim 1, wherein said first temperature of said water utilized in said wetting step a) is 50°–100° C.

7. The process according to claim 6, wherein said pressure of said evacuation is momentarily reduced to a value corresponding to the vapor pressure of water at said second temperature.

8. The process according to claim 6, wherein prior to said wetting step a), sifting the roasted and ground coffee to divide the coffee into a coarse fraction and a fine fraction, said coarse fraction constituting 1–10% by weight of the amount of coffee, while said fine fraction constitutes a remaining 90–99% by weight of the amount of coffee wherein said coarse fraction and fine fraction are according to step b) introduced in such a way that said coarse fraction is placed in said second end of the extractor.

9. The process according to claim 8, wherein said sifting is made by means of a sieve with a mesh size of approximately 4 mm.

10. The process according to claim 6, wherein the extractor is part of a battery of several extractors connected in series, wherein the extraction liquid which is introduced into a first extractor of said battery is water at 160°–190° C. under pressure, said first extractor containing the coffee which has been extracted for the longest period of time, while the final extract is recovered from a second extractor, said second extractor being the last of said several extractors to have been filled with said wetted coffee mixture.

11. A process for extracting an amount of roasted and ground coffee in an extractor, wherein the coffee is pre-wetted before being transferred to the extractor, the process comprising the steps of:
   a) wetting the coffee with water having a first temperature between 20° C. and 100° C. to obtain a wetted coffee mixture having a water content of 20–50% by weight, said wetted coffee mixture having a second temperature;
   b) transferring said wetted coffee mixture created in said step a) to the extractor to essentially fill the extractor therewith;
   c) after the extractor is essentially filled with said wetted coffee mixture, evacuating gases and water vapor from the extractor to obtain a pressure of between 600 millibar and a value corresponding to the vapor pressure of water at said second temperature obtained by said wetted coffee mixture as a result of said wetting step a);
   d) while maintaining an evacuated condition in said extractor, and prior to the introduction of gases or air into said evacuated extractor, introducing a hot, aqueous extraction liquid at a first end of said evacuated extractor to substantially fill said extractor, said introduction of said aqueous extraction liquid causing substantially no foam to be created; and
   e) supplying further hot, aqueous extraction liquid to said first end of the extractor and removing an aqueous extract containing both volatile coffee flavor components as well as non-volatile coffee flavor components from a second end of the extractor opposite said first end.

* * * * *